(12) United States Patent
Aykroyd et al.

(10) Patent No.: US 9,045,851 B2
(45) Date of Patent: Jun. 2, 2015

(54) METHOD OF OPERATING A LAUNDRY TREATING APPLIANCE CAPABLE OF SAVING LIQUID FOR REUSE

(75) Inventors: Timothy N. Aykroyd, Carmel, IN (US); Dennis L. Kehl, Benton Harbor, MI (US); Andrew E. Leitert, Eau Claire, MI (US); Karl David McAllister, Stevensville, MI (US); Tremitchell Wright, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 700 days.

(21) Appl. No.: 12/961,566

(22) Filed: Dec. 7, 2010

(65) Prior Publication Data

US 2012/0137447 A1    Jun. 7, 2012

(51) Int. Cl.
*D06F 35/00* (2006.01)
*D06F 39/00* (2006.01)

(52) U.S. Cl.
CPC ............ *D06F 35/005* (2013.01); *D06F 39/006* (2013.01); *Y02B 40/56* (2013.01)

(58) Field of Classification Search
CPC .................................................. D06F 35/005
USPC ............ 68/12.02, 12.13, 12.14, 12.19, 18 R, 68/902; 8/158, 159
See application file for complete search history.

(56) References Cited

U.S. PATENT DOCUMENTS

| | | | |
|---|---|---|---|
| 3,391,788 A * | 7/1968 | Strandberg, Jr. et al. ........ 210/87 |
| 5,241,843 A | 9/1993 | Hein |
| 5,285,665 A | 2/1994 | Hetrick, Jr. |
| 5,307,650 A | 5/1994 | Mertz |
| 5,617,885 A | 4/1997 | Centis |
| 5,829,459 A | 11/1998 | Milocco et al. |
| 6,393,643 B1 * | 5/2002 | Wientjens ......................... 8/159 |
| 6,474,111 B1 | 11/2002 | Pattee |
| 7,380,303 B2 | 6/2008 | Bellinetto et al. |
| 2005/0022564 A1 | 2/2005 | Kim et al. |
| 2005/0044640 A1 * | 3/2005 | Hyeong ........................... 8/159 |
| 2007/0119217 A1 | 5/2007 | Worthington |
| 2010/0024490 A1 | 2/2010 | Nieh et al. |

FOREIGN PATENT DOCUMENTS

| | | | |
|---|---|---|---|
| KR | 1019930028293 B1 | 10/1996 |
| WO | 2006/034558 A1 | 4/2006 |
| WO | 2006/073373 A1 | 7/2006 |

* cited by examiner

*Primary Examiner* — David Cormier

(57) ABSTRACT

A method of operating a laundry treating appliance by capturing and reusing at least a portion of the liquid supplied during a cycle of operation.

12 Claims, 5 Drawing Sheets

METHOD OF OPERATING A LAUNDRY TREATING APPLIANCE CAPABLE OF SAVING LIQUID FOR REUSE

BACKGROUND OF THE INVENTION

Laundry treating appliances, such as a washing machine, may implement cycles of operation to treat laundry. The cycles of operation typically include the application of liquids, with or without a treating chemistry, such as a water and detergent mixture during a washing phase and water during a rinsing phase. The liquids are typically extracted between phases, such as by rotating at high speeds a drum holding the laundry. In most commercially available household laundry treating appliances, the extracted liquid is then disposed of by draining the liquid through the household drain, regardless of whether the liquid is suitable for reuse.

SUMMARY OF THE INVENTION

The invention relates to a method for operating a laundry treating appliance so as to estimate an amount of liquid saved for reuse, which may be based on the amount of liquid that was supplied to the appliance prior to an extraction of the liquid.

DESCRIPTION OF EMBODIMENTS OF THE INVENTION

Figure 1:
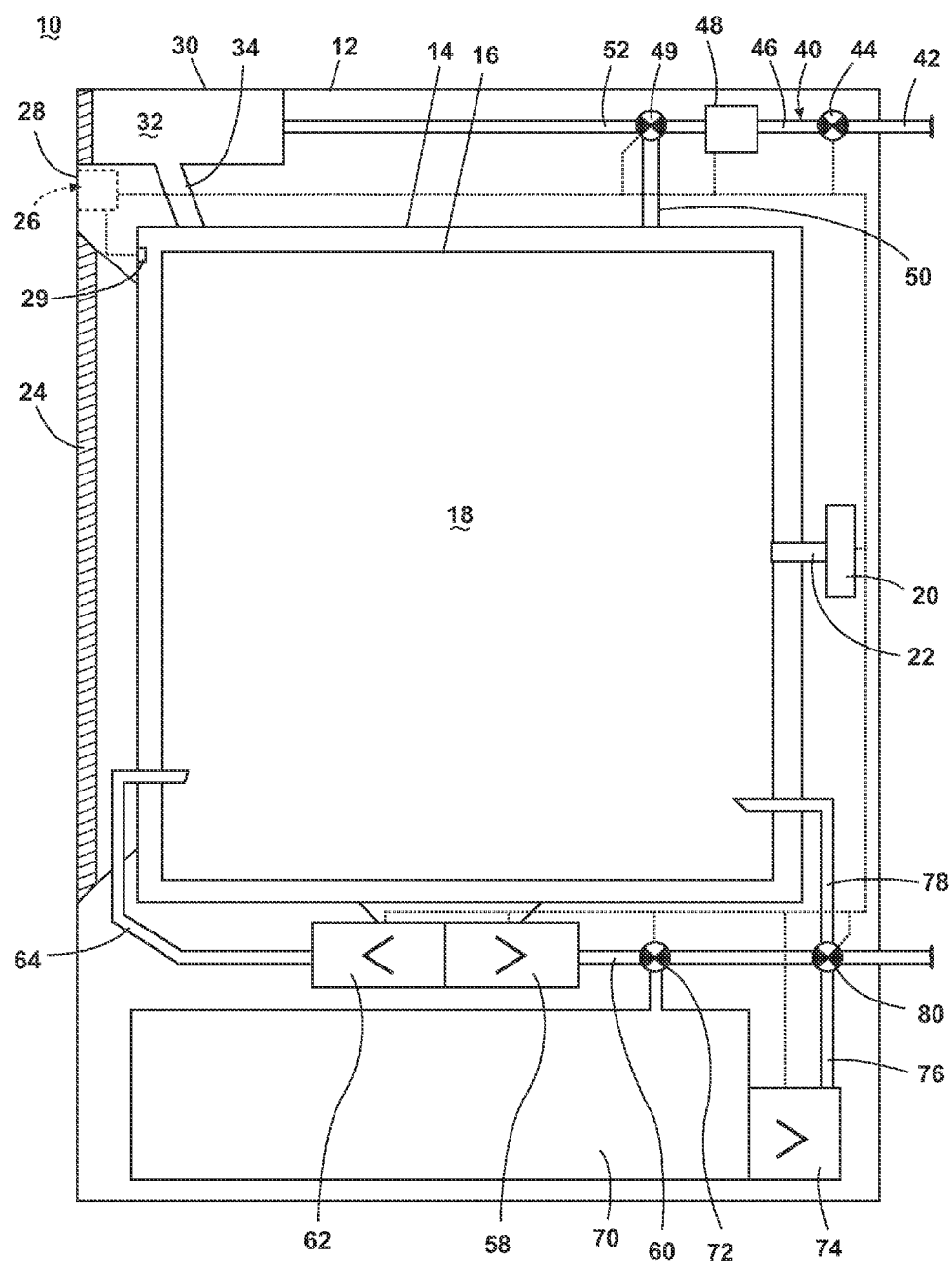
FIG. 1 is a schematic view of a laundry treating appliance according to a first embodiment of the invention.

FIG. 1 schematically illustrates a first embodiment of the invention in the environment of a laundry treating appliance, such as a laundry treating appliance in the form of a clothes washing machine 10 comprising a housing 12, which may be a cabinet, chassis, or both, defining an interior. As illustrated, the laundry treating appliance is a horizontal axis clothes washing machine; however, the laundry treating appliance may be any appliance which performs a cycle of operation on laundry, non-limiting examples of which include a vertical-axis washing machine; a combination washing machine and clothes dryer; a tumbling or stationary refreshing/revitalizing machine; an extractor; and a revitalizing machine. The washing machine 10 described herein shares many features of a traditional automatic clothes washing machine, which will not be described in detail except as necessary for a complete understanding of the invention. Further, it should be understood that the invention may be adapted for use with other appliances, such as dishwashers.

A tub 14 may be provided in the interior of the housing 12 and may be configured to hold liquid. The tub 14 may be supported within the housing 12 by a suitable suspension system (not shown). A drum 16 may be provided within the tub 14 and may at least partially define a treating chamber 18 for receiving fabric, such as laundry to be treated according to a cycle of operation. The drum 16 may be mounted for rotation within the tub 14. The drum 16 may have perforations that permit the flow of liquid between the drum 16 and the tub 14.

The drum 16 may be coupled with a motor 20 through a drive shaft 22 for selective rotation of the treating chamber 18 during a cycle of operation. It may also be within the scope of the invention for the motor 20 to be coupled with the drive shaft 22 through a drive belt for selective rotation of the treating chamber 18. The motor 20 may rotate the drum 16 at multiple or variable speeds and in opposite rotational directions. Further, the motor 20 may rotate the drum 16 at tumbling speeds wherein the fabric items in the drum 16 rotate with the drum 16 from a lower location of the drum 16 towards a higher location of the drum 16, but fall back under the force of gravity to the lower location of the drum 16 before reaching the highest location of the drum 16. Typically, the centrifugal force applied to the fabric items during rotation of the drum at the tumbling speeds may be less than one gravitational force (1 G). The motor 20 may also rotate the drum 16 at spin speeds wherein the fabric items rotate with the drum 16 without falling. In the washing machine art, the spin speeds may also be referred to as satellizing speeds or sticking speeds. Typically, the force applied to the fabric items at the spin speeds may be greater than or about equal to 1 G. As used herein, "tumbling" of the drum 16 refers to rotating the drum at a tumble speed, "spinning" the drum 16 refers to rotating the drum 16 at a spin speed, and "rotating" of the drum 16 refers to rotating the drum 16 at any speed.

The tub 14 and drum 16 may have aligned openings, which provide access to the treating chamber 18. A door 24 may be provided to selectively close at least one of the aligned openings to selectively provide access to the treating chamber 18. While the illustrated washing machine 10 includes both the tub 14 and the drum 16, with the drum 16 defining the laundry treating chamber 18, it is within the scope of the invention for the washing machine 10 to include only one receptacle, with the receptacle defining the laundry treating chamber for receiving the laundry load to be treated.

A controller 26 may be located within the housing 12 for controlling the operation of the washing machine 10 to implement one or more cycles of operation, which may be stored in a memory of the controller 26. Examples, without limitation, of cycles of operation include: wash, heavy duty wash, delicate wash, quick wash, refresh, rinse only, and timed wash. A user interface 28 may also be included on the housing 12 and may include one or more knobs, switches, displays, and the like for communicating with the user, such as to receive input and provide output. One or more moisture sensors 29 may be located inside the tub 14 and may output a signal indicative of the moisture content of the laundry load. Further, additional sensors (not shown) may be included in the washing machine 10; non-limiting examples of which may include a turbidity sensor, a tensiometer, etc.

A dispensing system illustrated as a treating chemistry dispenser 30 may be provided within the housing 12 and may include at least one treating chemistry reservoir 32. The treating chemistry dispenser 30 may be provided on an exterior or interior of the housing 12 and may be immediately accessible by the user or hidden behind a cover or an access panel. One or more treating chemistries may be provided in the treating chemistry reservoir 32 in any desirable configuration, such as a single charge, multiple charge (also known as bulk dispenser), or both. Examples of typical treating chemistries include, without limitation, water, detergent, bleach, fabric softener, and enzymes. An outlet conduit 34 may fluidly couple the treating chemistry dispenser 30 with the tub 14. The outlet conduit 34 may couple with the tub 14 at any suitable location on the tub 14 and is shown as being coupled with a top wall of the tub 14 for exemplary purposes. The treating chemistry that flows from the treating chemistry dispenser 30 through the outlet conduit 34 to the tub 14 typically enters a space between the tub 14 and the drum 16.

A liquid supply system 40 may also be included in the washing machine 10 to supply liquid to both the treating chemistry dispenser 30 and/or the tub 14. More specifically, liquid such as water may be supplied from a water source, such as a household water supply 42, to the washing machine 10 by operation of a valve 44 controlling the flow of liquid through an inlet conduit 46. A flow meter 48 may be located in the inlet conduit 46 and may have any suitable output representative of the flow of liquid through it. A valve 49 may also fluidly couple with the inlet conduit 46 and may have two outlets such that it may determine a flow of liquid through a first supply conduit 50 leading to the tub 14 and may determine a flow of liquid through a second supply conduit 52 leading to the treating chemistry dispenser 30.

A liquid drain system may be provided for draining liquid from the treating chamber 18. The liquid draining system may include a drain pump 58 and a drain conduit 60. The drain pump 58 fluidly couples the tub 14 to the drain conduit 60 such that liquid in the tub 14 may be drained via the drain conduit 60. The drain conduit 60 may be coupled with a household drain. The drain pump 58 may be located in a low portion or sump of the tub 14.

A liquid recirculation system may be provided for recirculating liquid to the treating chamber 18. As illustrated, the recirculation system includes a recirculation pump 62 and a spray conduit 64. The recirculation pump 62 may fluidly couple the tub 14 to the spray conduit 64 such that liquid in the tub 14 may be supplied to the spray conduit 64, where it may be sprayed into the treating chamber 18. The recirculation pump 62 may be fluidly coupled to a low portion or sump of the tub 14. The spray conduit 64 may direct the liquid from the recirculation pump 62 into the drum 16 in any suitable manner, such as by spraying, dripping, or providing a steady flow of the liquid.

A reuse tank 70 for storing liquid may also be included in the washing machine 10. The reuse tank 70 may be fluidly coupled with the drain conduit 60 by a valve 72 such that liquid being pumped by the drain pump 58 may be supplied to the reuse tank 70 instead of being pumped to the household drain. Thus, the reuse tank 70 may capture liquid from one or more phases of a cycle of operation for later use. A reuse pump 74 may fluidly couple the reuse tank 70 to the treating chamber 18 through an outlet conduit 76 and a spray conduit 78 such that the liquid in the reuse tank 70 may be supplied to the drum 16. The spray conduit 78 may direct the liquid from the reuse pump 74 into the drum 16 in any suitable manner, such as by spraying, dripping, or providing a steady flow of the liquid. It is also illustrated that the outlet conduit 76 may fluidly couple the drain conduit 60 through a valve 80. In this manner, liquid in the reuse tank 70 may be drained to the household drain through the reuse pump 74, outlet conduit 76, valve 80, and drain conduit 60. Alternatively, the output of the reuse pump 74 may be fluidly coupled to the spray conduit 64 instead of using a separate spray conduit 78.

During operation of the washing machine 10, the controller 26 may be operably coupled with one or more components of the washing machine 10 for communicating with and controlling the operation of the component to complete a cycle of operation. For example, the controller 26 may be operably coupled with at least the liquid supply valve 44, the flow meter 48, the drain pump 58, recirculation pump 62, the reuse pump 74, and the motor 20 to control the operation of these and other components to implement one or more of the cycles of operation.

In general, during operation of the washing machine 10, liquid may be supplied from the water supply 42 by the valve 44, flow meter 48, and valve 49 directly to the tub 14 or indirectly to the tub 14 through the treating chemistry dispenser 30 for the cycle of operation. After use during the cycle of operation, the liquid in the tub 14 may be drained into the reuse tank 70 for subsequent reuse or may be directly drained to the household drain.

It has been contemplated that the user interface 28 may include an optional button, which is operable by a user, to select whether liquid used during the cycle of operation is drained into the reuse tank 70 or is drained to the household drain. In this manner, the user may control if liquid is reused and may bypass sending liquid to the reuse tank 70 altogether if the user determines that the laundry load to be treated is too heavily soiled. Alternatively, the determination that the liquid should be directly drained to the household drain, based on its soil level or water quality, may be automatically determined by the controller 26 based on input from one or more sensors in the washing machine 10.

It has also been contemplated that instead of using the drain pump 58 to supply liquid to the reuse tank 70 that the recirculation pump 62 and appropriate conduits and valving could be used. As another alternative, a dedicated pump (not shown) may be used to supply liquid to the reuse tank 70. As yet another alternative, the reuse tank 70 may also be fluidly coupled directly to a sump of the tub 14 by an outlet conduit and valve such that the reuse tank 70 may be gravity fed. Further, while a separate recirculation pump 62 and the drain pump 58 have been illustrated a single pump, which may be operated to supply liquid to either the drain conduit 60 or the spray conduit 64 has been contemplated.

In yet another alternative, the reuse tank 70 may be drained by supplying the liquid to the tub 14 through the reuse pump 74 and then actuating the drain pump 58 instead of directly draining the liquid to the household drain. It has also been contemplated that additional control valving and supply lines may be added to the outlet conduit 76 such that liquid from the reuse tank 70 may be pumped by the reuse pump 74 to other appliances or other areas of the home such that a user may use the liquid in the reuse tank 70 for other subsequent uses or purposes. Further, it has been contemplated that the reuse tank 70 may be provided at other locations outside of the washing machine 10 such that its capacity may be substantially increased.

Figure 2:
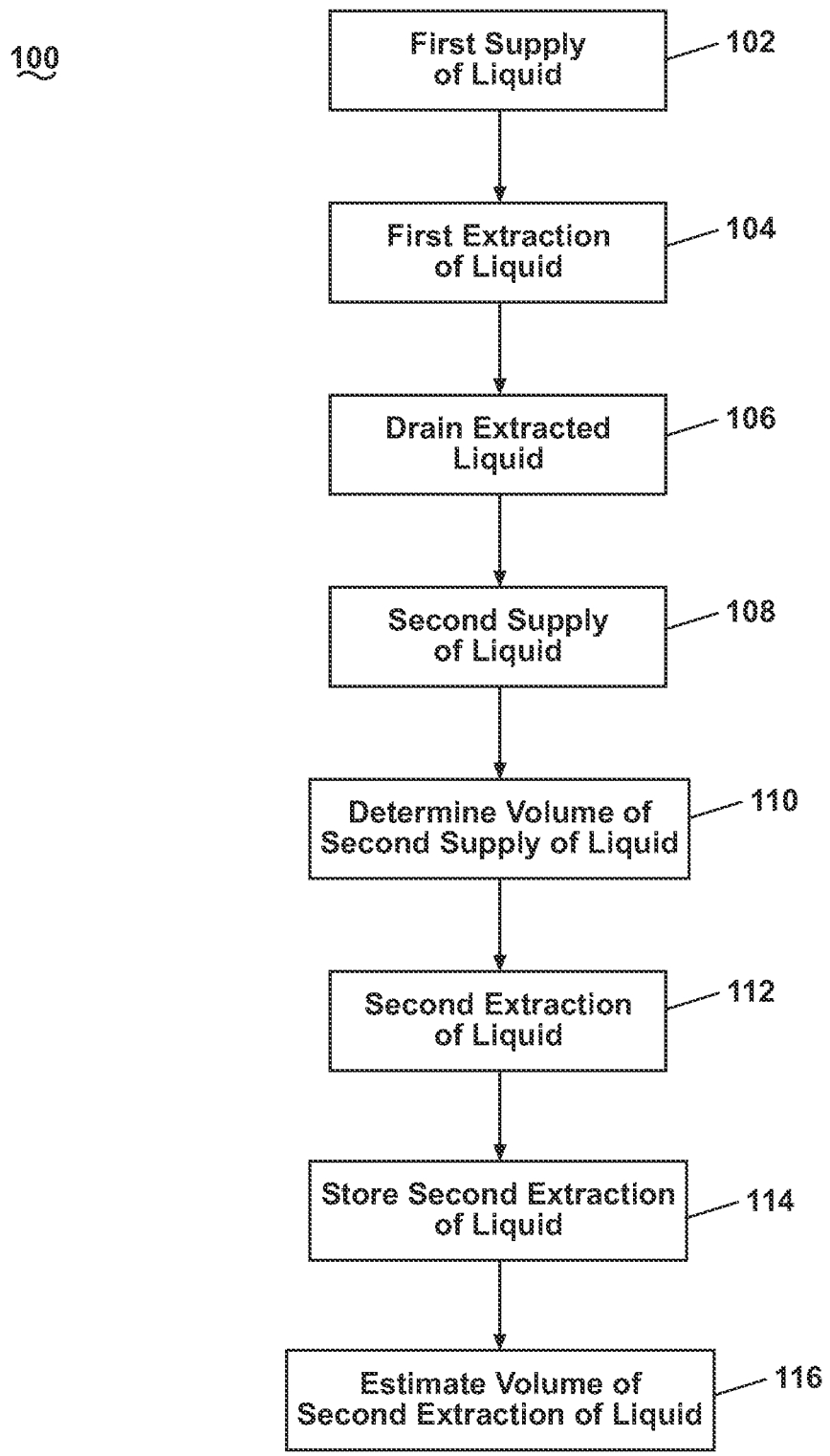
FIG. 2 is a flow chart illustrating a method for operating a laundry treating appliance according to a second embodiment of the invention.

The previously described washing machine 10 may be used to implement one or more embodiments of a method of the invention. Referring now to FIG. 2, a flow chart of one embodiment of a method 100 for operating the washing machine 10 to obtain an amount of liquid which may be reused is illustrated. The method 100 is described in the context of a first and second charge of liquid. The charge of liquid may be at any phase of a cycle where liquid is supplied, such as a wash phase or a rinse phase. It is within the scope of the invention for the method 100 to be used at any point during any cycle of operation of the washing machine 10.

The method 100 starts with assuming that the user has placed one or more fabric items or a laundry load within the treating chamber 18 for treatment and selected a cycle of operation through the user interface 28. At 102 a first charge of liquid may be introduced to the treating chamber 18 to wet the laundry within the treating chamber 18. This first charge of liquid may be introduced through the valve 49 directly to the tub 14 or indirectly to the tub 14 through the treating chemistry dispenser 30.

It has been contemplated that the first charge of liquid may be a predetermined volume of liquid such that the controller 26 may operate the valve 44, flow meter 48, and valve 49 to supply a first predetermined volume of liquid to the tub 14. To supply a first predetermined volume of liquid, the controller 26 opens the valve 44 and directs the output of the valve 49 to the appropriate first or second supply conduit 50, 52 to begin the supply of the first charge of liquid and closes the valve 44 when the flow meter 48 indicates that the first predetermined volume of liquid has been supplied. Regardless of whether the first charge is a predetermined volume or not, the first charge of liquid supplied may be any suitable charge for a phase of the cycle of operation such as a pre-soak phase, a wash phase, or a first rinse phase and in such instances the first charge of liquid may be considered a pre-soak liquid, a wash liquid, or a rinse liquid, respectively.

At 104, the drum 16 may be rotated at predetermined extraction speeds to achieve an extraction of liquid from the laundry load. The predetermined extraction speed profile used may be any suitable extraction profile. Typical extraction profiles include the motor 20 increasing the rotational speed of the drum 16 according to various speed ramps and speed plateaus or include the motor 20 increasing the rotational speed of the drum 16 according to a single speed ramp and then holding that set speed. The liquid extracted from the laundry load according to the predetermined extraction speed profile forms a first extracted amount of liquid, which may then be drained at 106.

At 108, a second charge of liquid may be introduced to the treating chamber 18 to wet the laundry within the treating chamber 18. This second charge of liquid may also be introduced through the valve 49 directly to the tub 14 or indirectly to the tub 14 through the treating chemistry dispenser 30. The second charge of liquid supplied may be any suitable charge for a phase of the cycle of operation such as a wash phase, a first rinse phase, or a second rinse phase and in such instances the second charge of liquid may be considered a wash liquid or a rinse liquid, respectively.

At 110, the volume of the second charge of liquid may be determined. For the determining the volume of the second charge of liquid at 110, output from the flow meter 48 may be used to determine the volume of the second charge of liquid supplied at 108. The flow meter 48 may output a signal, which may be indicative of the volume or by which the controller 26 may determine the volume. For example, the flow meter 48 may include a propeller (not shown) located in the flow of liquid and which may be rotated by the flowing liquid. A signal may be sent to the controller 26 for each revolution of the propeller. Each revolution of the propeller and consequently each signal may be equal to a certain volume of the fluid. Thus, the controller 26 may calculate the total volume by counting the number of signals. Alternatively, the flow meter may output a signal indicative of the total number of revolutions and the controller 26 may calculate the volume of liquid supplied based upon that signal. Alternatively, the flow meter 48 may directly output the volume of liquid supplied, thereby negating the need to calculate the volume.

At 112, the drum 16 may be rotated at the same predetermined extraction speed profile as used at 104, for the same amount of time as in 104, to achieve a second extraction of liquid from the laundry load. The liquid extracted from the laundry load according to the predetermined extraction speed profile forms a second extracted amount of liquid, which may be sent to the reuse tank 70 at 114.

At 116, the volume of the second extracted amount of liquid may be estimated as a function of the determined volume of the second charge of liquid. More specifically, the volume of the second extracted amount of liquid may be estimated to be approximately equal to the determined volume of the second charge of liquid because the first and second extractions of liquid at 104, 112 used the same spin profile. The premise underlying this premise is that if the same extraction profile is used during the first and second extractions, then the residual moisture of the laundry must be the same, and all of the liquid from the second charge of liquid 108 must be residing in the tub and available for reuse.

There are, of course, variables that may cause this relationship to not hold perfectly true. For example, the location of the inlets to the drain pump may be above the bottom of the liquid in the tub, making it impossible to remove all of the supplied liquid. It may also be that some of the liquid pump to the reuse tanks may still reside in the drain conduit, which may be drained away in subsequent draining operations. The controller may not have identically implemented both spin profiles. Other correction factors, which may be relevant to the saturation of the laundry load, may include the load mass, load type, cycle selection, water temperatures, and water pressure. While such factors may be taken into consideration to correct or better estimate the second extracted amount of liquid, it has been found that any associated error between the volume of the second charge of liquid and the second extraction of liquid is inconsequential to the practical implementation of the method.

It has been contemplated that the determination of the volume of the second extracted amount of liquid may occur before the second extracted amount of liquid is sent to be stored in the re-use tank 70. In this manner, the estimated volume may be used in determining what may be done with the second extracted amount of liquid. For example, a running total of the extracted liquid, which has been sent to the reuse tank 70, may be stored by the controller 26. The controller 26 may also be able to determine the volume of liquid that has been pumped out of the reuse tank 70 using the reuse pump 74. If the volume of the second extracted amount of liquid is larger than the remaining open volume in the reuse tank 70, the controller 26 may determine that the second extracted amount of liquid would overflow the reuse tank 70 and may send all or a portion of the second extracted amount of liquid to the household drain.

Thus, based on the estimated volume of the second extracted amount of liquid the second extracted amount of liquid may be stored in the re-use tank 70 or it may be drained. It has also been contemplated that additional reuse tanks may be fluidly coupled with the washing machine 10 through appropriate valving and conduits such that the second extracted amount of liquid may be drained to some other storage system so that the liquid may be reused in other parts of the household.

The method 100 provides an inexpensive method for determining an amount of liquid extracted by the washing machine 10 such that it may determine the amount which may be reused and may determine whether to send all or a portion of the second extracted amount of liquid to the reuse tank 70. The method 100 requires no additional sensors or measuring devices, than those already located in the washing machine 10, to determine the amount of liquid that may be stored in the reuse tank 70. Liquid stored in the reuse tank 70 may subsequently be used in another phase of the cycle of operation, in a subsequent cycle of operation of the clothes washing machine 10, or by another household appliance or household application if the appropriate additional valving and conduits are installed. Further, it has been contemplated that the reuse tank 70 may be located outside of the housing 12 such that its storage capability may be less limited and that it may have such additional valving and conduits such that the liquid may be reused in many other household applications (irrigation, flushing toilets, etc.). As an alternative to the draining at 106, the first extracted amount of liquid may be sent to the reuse tank 70 or to some other storage system so that the first liquid may also be reused. It should be noted that the storing at 114 of the second extracted amount may occur only when a soil level of the second extracted amount of liquid is less than a predetermined amount. In this manner the controller 26 may operate to drain the second extracted amount if the water quality is poor. As a further alternative, the second extracted amount may not be stored at 114 if the user selects that the liquid should be drained.

Figure 3:
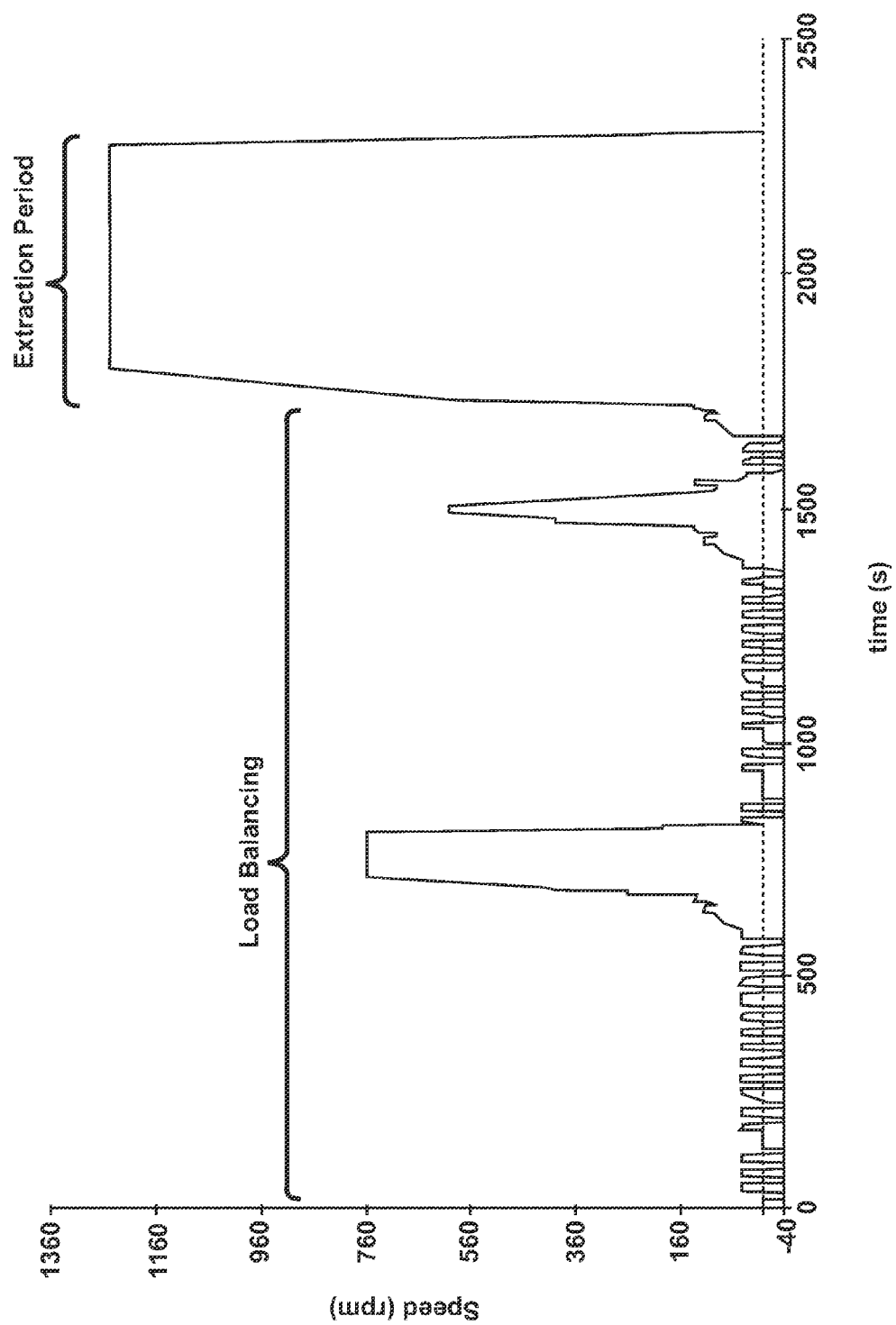
FIG. 3 is a graph illustrating one exemplary speed profile of a spin cycle in the washing machine of FIG. 1.

By way of non-limiting example, FIG. 3 illustrates an example of an extraction profile, which may be used at 104 and 112. FIG. 3 illustrates a typical extraction profile where the motor 20 increases the rotational speed of the drum 16 according to a speed ramp and then holds that set speed for the remainder of the extraction period. A load balancing portion of the extraction phase is also illustrated; this may be commonly included in the extraction phase to determine an out of balance condition. As an alternative, this portion of the extraction phase may be excluded and the drum 16 may just be accelerated with a generally linear relation between drum RPM (speed) and time until it reaches a predetermined speed threshold, such as a minimum upper speed threshold, at which point the speed may be held at the predetermined speed threshold for the remainder of the extraction period. As another alternative, the drum 16 may be accelerated in a non-linear manner, such as step-wise, until it reaches a predetermined speed threshold at which point the speed may be held at the predetermined speed threshold for the remainder of the extraction period.

Figure 4:
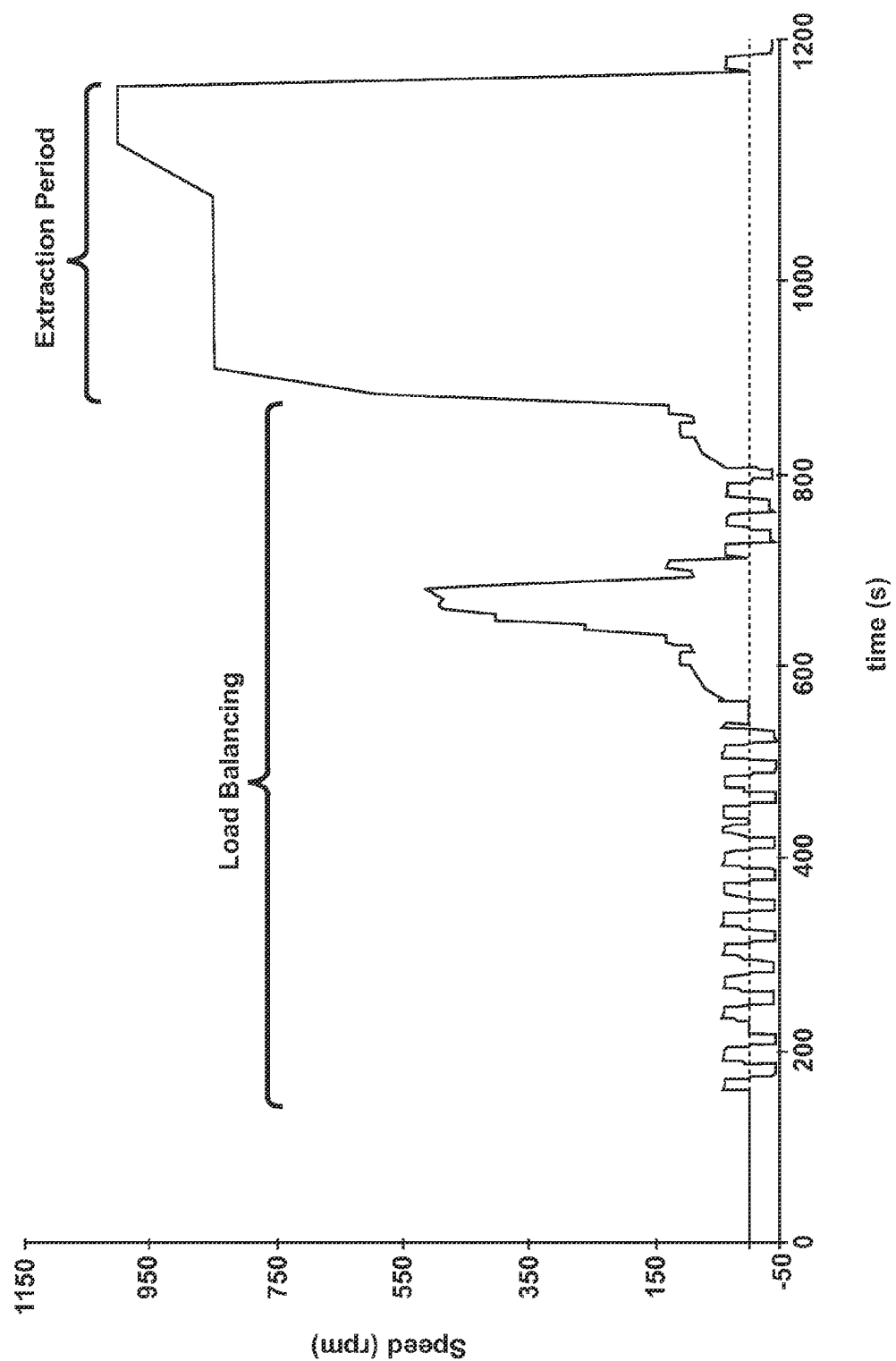
FIG. 4 is a graph illustrating a second exemplary speed profile of a spin cycle in the washing machine of FIG. 1.

By way of an additional non-limiting example, FIG. 4 illustrates an example of another extraction profile, which includes various speed ramps and speed plateaus. The predetermined extraction speed profile is not germane to the invention and it has been contemplated that the drum 16 may be rotated in any of several manners, such as at a constant speed, at multiple speeds, according to a speed ramp profile having multiple spin/tumble speeds, or according to a continuous speed ramp. For example, during the spinning of the drum 16, the drum 16 may rotate at a single spin speed, two or more spin speeds (e.g., rotate at a first spin speed for a predetermined period of time followed by rotate at a second spin for a predetermined period of time), at a spin profile having several discrete spin speeds, or at a continuously increasing speed ramp between a first spin speed and a second spin speed. The drum 16 may also be alternatingly tumbled and spun whereby the speed of the drum 16 alternatingly increases and decreases. Furthermore, during the spinning of the drum 16 and/or the tumbling of the drum 16, the drum 16 may be spun or tumbled in a single direction or in alternating directions. Further, it has also been contemplated that the drum 16 may be rotated based on the estimated second extracted amount of liquid. That is, the drum 16 may be rotated until it has been determined that the second volume has been extracted.

Figure 5:
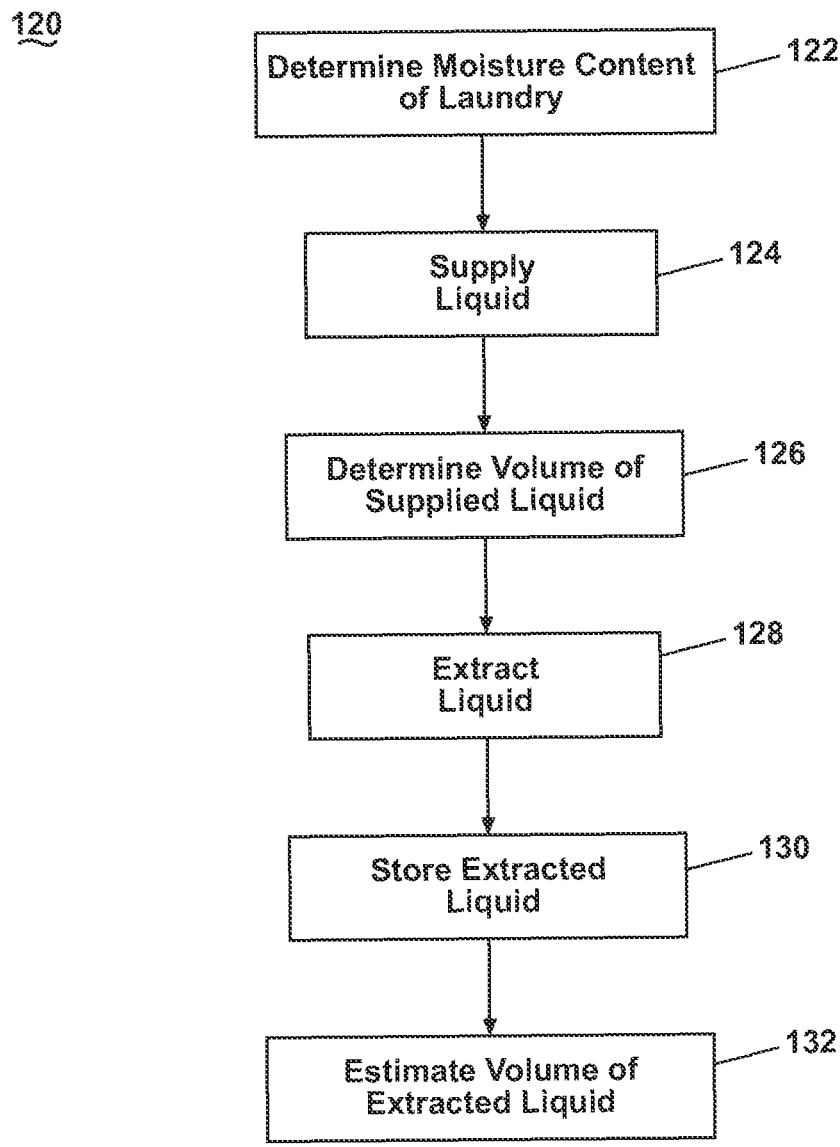
FIG. 5 is a flow chart illustrating a method for operating a laundry treating appliance according to a third embodiment of the invention.

Referring now to FIG. 5, a flow chart of another embodiment of a method 120 for operating the washing machine 10 to obtain an amount of liquid that may be reused is illustrated. The method 120 starts with assuming that the user has placed one or more fabric items or a laundry load within the treating chamber 18 for treatment and selected a cycle of operation through the user interface 28.

At 122, a residual moisture content (RMC) of the laundry load may be determined. The specific manner in which the RMC of the load may be determined is not germane to the invention and, therefore, it is within the scope of the invention for any suitable method to be used to determine the RMC of the load. For example, the RMC of the laundry may be based on the readings of one or more moisture sensors 29 in the form of conductivity strips, such as is described in U.S. Pat. No. 6,446,357 to Woerdehoff et al.

In practice, the washing machine 10 may supply liquid to the treating chamber 18 to achieve a predetermined initial RMC of the laundry. Thus, the controller 26 of the washing machine 10 may cause an initial RMC to be reached and may not actually execute the above determination of the RMC and instead will use the predetermined initial RMC achieved.

After the RMC is determined at 122, liquid may be supplied at 124 to the treating chamber 18 to wet the laundry in the treating chamber 18. This supply of liquid may be introduced by the valve 49 directly to the tub 14 or indirectly to the tub 14 through the treating chemistry dispenser 30. The supply of liquid at 124 may be done in the same manner as previously described at 102 and 108. At 126 the volume of the supply of liquid may be determined, which may be done in the same manner as previously described at 110.

At 128, the drum 16 may be rotated to achieve an extraction of liquid from the laundry load. At 128 the drum 16 may be rotated until the RMC substantially equals the pre-supply RMC determined at 122. The determination of the RMC during the rotation of the drum 16 at 128 may be determined using the moisture sensor 29 in a manner similar to that at 122. The drum 16 may be rotated continuously at 128 until the pre-supply RMC has been reached or alternatively, the drum 16 may be rotated in discrete increments until the pre-supply RMC has been reached. Similarly, the determination of the RMC may be made continuously throughout the rotation of the drum at 128 or at predetermined intervals.

Once the pre-supply RMC has been reached, the liquid extracted from the laundry load at 128 forms an extracted amount of liquid. The extracted amount of liquid may be sent to the reuse tank 70 at 130. At 132 the extracted amount of liquid may be estimated as a function of the volume determined at 126. As the same RMC is achieved at 128 as was initially determined before the supply of liquid at 124 it may be assumed that the liquid in the laundry load is the same and that all of the liquid supplied at 124 has been extracted at 128. Thus, the extracted amount of liquid may be assumed to be approximately the same as the volume of the supply of liquid, which was determined at 126.

As with method 100 described above, it has also been contemplated that the determination of the volume of the extracted liquid may occur before the extraction of liquid may be sent to be stored in the re-use tank 70 and that the storing at 130 may occur only when a soil level of the extracted amount of liquid is less than a predetermined amount. Further, the extracted amount may not be stored at 130 if the user selects that the liquid should be drained.

The method 120 differs from the method 100 in that the method 120 does not require a second charge of liquid and second extraction of liquid to determine the volume of liquid extracted. However, the method 120 does require a moisture sensor, which is not needed in the method 100, to determine the amount of liquid extracted from the laundry. In this manner, the method 120 allows for any of the liquid supplied to the treating chamber 18 to be reused as a first initial supply and extraction are not necessary to determine the amount of liquid extracted.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a laundry treating appliance having a rotatable treating chamber in which laundry is received for treatment, the method comprising:
    determining a moisture content of the laundry to define a pre-supply moisture content and recording the determined pre-supply moisture content in a controller;
    supplying a charge of liquid to the treating chamber to wet laundry within the treating chamber;
    determining a volume of the charge of liquid supplied to the treating chamber;
    extracting liquid from the laundry to form an extracted amount of liquid in the treating chamber by rotating the treating chamber until the moisture content substantially equals the pre-supply moisture content stored in the controller;
    storing in a tank the extracted amount of liquid for subsequent use;
    estimating the volume of the extracted amount of liquid stored in the tank as substantially equal to the determined volume of the charge of liquid supplied to the treating chamber; and
    returning the extracted amount of liquid stored in the tank to the treating chamber.

2. The method of claim 1 wherein the charge of liquid comprises a rinse liquid.

3. The method of claim 2, further comprising wetting the laundry with a liquid prior to the determining the pre-supply moisture content.

4. The method of claim 2 wherein the extraction comprises rotating the treating chamber according to a predetermined extraction speed profile.

5. The method of claim 4 wherein the predetermined extraction speed profile comprises rotating the treating chamber at predetermined speeds for predetermined times.

6. The method of claim 5 wherein the predetermined extraction speed profile comprises increasing the rotational speed until a speed threshold is satisfied.

7. The method of claim 6 wherein the speed threshold comprises a minimum upper speed threshold.

8. The method of claim 2 wherein the tank is located within the laundry treating appliance and storing the extracted amount of liquid comprises storing the extracted amount of liquid in the tank in the laundry treating appliance.

9. The method of claim 2, further comprising maintaining a running total of the extracted liquid that is stored based on the estimated volume.

10. The method of claim 1, wherein the storing the extracted amount of liquid comprises storing the extracted amount of liquid when a soil level of the extracted amount of liquid is less than a predetermined amount.

11. A method of operating a laundry treating appliance having a rotatable treating chamber in which laundry is received for treatment, the method comprising:
    determining a moisture content of the laundry to define a pre-supply moisture content;
    supplying a charge of liquid to the treating chamber to wet the laundry within the treating chamber;
    extracting liquid from the laundry to form an extracted amount of liquid in the treating chamber by rotating the treating chamber and comparing the moisture content of the laundry such that liquid is extracted until the moisture content substantially equals the pre-supply moisture content previously determined;
    determining whether a user input indicative of not storing the extracted amount of liquid is received; and
    not storing the extracted amount when the user input indicative of not storing is received.

12. The method of claim 1 wherein determining the moisture content of the laundry to define the pre-supply moisture content comprises supplying liquid to the treating chamber to achieve a predetermined moisture content.

* * * * *